US008131780B2

(12) United States Patent
Amarendran et al.

(10) Patent No.: US 8,131,780 B2
(45) **Date of Patent: *Mar. 6, 2012**

(54) SYSTEMS AND METHODS FOR MANAGING LOCATION OF MEDIA IN A STORAGE SYSTEM

(75) Inventors: Arun Prasad Amarendran, Bangalore (IN); Rajiv Kottomtharayil, Ocean, NJ (US); Zahid Ilkal, Ocean, NJ (US)

(73) Assignee: Comm Vault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,178

(22) Filed: Jun. 6, 2011

(65) Prior Publication Data

US 2011/0238695 A1 Sep. 29, 2011

Related U.S. Application Data

(63) Continuation of application No. 12/952,456, filed on Nov. 23, 2010, now Pat. No. 7,958,086, which is a continuation of application No. 12/572,120, filed on Oct. 1, 2009, now Pat. No. 7,844,573, which is a continuation of application No. 11/638,085, filed on Dec. 13, 2006, now Pat. No. 7,603,386, which is a continuation of application No. 10/663,383, filed on Sep. 16, 2003, now Pat. No. 7,162,496.

(60) Provisional application No. 60/411,267, filed on Sep. 16, 2002.

(51) Int. Cl.
*G06F 17/30* (2006.01)

(52) U.S. Cl. ........ 707/812; 707/769; 707/609; 711/114; 711/161

(58) Field of Classification Search ........... 707/999.104, 707/609, 769, 812; 711/111, 114, 161
See application file for complete search history.

(56) References Cited

U.S. PATENT DOCUMENTS 4,686,620 A 8/1987 Ng
(Continued)

FOREIGN PATENT DOCUMENTS

EP 0259912 3/1988
(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Jean M Corrielus
(74) *Attorney, Agent, or Firm* — Knobbe, Martens, Olson & Bear, LLP

(57) ABSTRACT

A system and method for operating a storage library. The system comprises a management server, a media agent connected to the management server, a library connected to the media agent and a database connected to the management server. The management server controls the media agent to monitor for the addition or removal of a piece of media in the library. When the media agent determines that the piece of media has been added to the library or removed from the library, the media agent causes the library to read a media label stored as data on the piece of media, the media label including an identifier identifying the piece of media. When a backup or restore is performed, the system checks the media label to ensure that the correct media is being used. Inventory procedures are disclosed. Media labels are stored in a database along with an indication of the corresponding slot where the media is stored, a time when the label was put on the medium, and a confidence parameter indicating how confident the system is that the particular medium is stored in the respective slot.

14 Claims, 3 Drawing Sheets

S130
detected sighted and blind libraries
S135
update storage management database
S140
monitor for addition or removal of media
S145
sighted or blind library
Sighted
Blind
S150
scan bar code of each media
S155
read or create OML
S160
update storage management database

U.S. PATENT DOCUMENTS

| | | | | |
|---|---|---|---|---|
| 4,995,035 | A | 2/1991 | Cole et al. | |
| 5,005,122 | A | 4/1991 | Griffin et al. | |
| 5,093,912 | A | 3/1992 | Dong et al. | |
| 5,133,065 | A | 7/1992 | Cheffetz et al. | |
| 5,193,154 | A | 3/1993 | Kitajima et al. | |
| 5,212,772 | A | 5/1993 | Masters | |
| 5,226,157 | A | 7/1993 | Nakano et al. | |
| 5,239,647 | A | 8/1993 | Anglin et al. | |
| 5,241,668 | A | 8/1993 | Eastridge et al. | |
| 5,241,670 | A | 8/1993 | Eastridge et al. | |
| 5,276,860 | A | 1/1994 | Fortier et al. | |
| 5,276,867 | A | 1/1994 | Kenley et al. | |
| 5,287,500 | A | 2/1994 | Stoppani, Jr. | |
| 5,321,816 | A | 6/1994 | Rogan et al. | |
| 5,333,315 | A | 7/1994 | Saether et al. | |
| 5,347,653 | A | 9/1994 | Flynn et al. | |
| 5,410,700 | A | 4/1995 | Fecteau et al. | |
| 5,416,914 | A | 5/1995 | Korngiebel et al. | |
| 5,426,284 | A | 6/1995 | Doyle | |
| 5,448,724 | A | 9/1995 | Hayashi et al. | |
| 5,491,810 | A | 2/1996 | Allen | |
| 5,495,607 | A | 2/1996 | Pisello et al. | |
| 5,504,873 | A | 4/1996 | Martin et al. | |
| 5,544,345 | A | 8/1996 | Carpenter et al. | |
| 5,544,347 | A | 8/1996 | Yanai et al. | |
| 5,559,957 | A | 9/1996 | Balk | |
| 5,619,644 | A | 4/1997 | Crockett et al. | |
| 5,638,509 | A | 6/1997 | Dunphy et al. | |
| 5,673,381 | A | 9/1997 | Huai et al. | |
| 5,699,361 | A | 12/1997 | Ding et al. | |
| 5,729,743 | A | 3/1998 | Squibb | |
| 5,751,997 | A | 5/1998 | Kullick et al. | |
| 5,758,359 | A | 5/1998 | Saxon | |
| 5,761,677 | A | 6/1998 | Senator et al. | |
| 5,764,972 | A | 6/1998 | Crouse et al. | |
| 5,778,395 | A | 7/1998 | Whiting et al. | |
| 5,812,398 | A | 9/1998 | Nielsen | |
| 5,813,009 | A | 9/1998 | Johnson et al. | |
| 5,813,017 | A | 9/1998 | Morris | |
| 5,870,630 | A | 2/1999 | Reasoner et al. | |
| 5,875,478 | A | 2/1999 | Blumenau | |
| 5,884,067 | A | 3/1999 | Storm et al. | |
| 5,887,134 | A | 3/1999 | Ebrahim | |
| 5,901,327 | A | 5/1999 | Ofek | |
| 5,924,102 | A | 7/1999 | Perks | |
| 5,950,205 | A | 9/1999 | Aviani, Jr. | |
| 5,974,563 | A | 10/1999 | Beeler, Jr. | |
| 6,021,415 | A | 2/2000 | Cannon et al. | |
| 6,026,414 | A | 2/2000 | Anglin | |
| 6,041,329 | A | 3/2000 | Kishi | |
| 6,052,735 | A | 4/2000 | Ulrich et al. | |
| 6,076,148 | A | 6/2000 | Kedem et al. | |
| 6,094,416 | A | 7/2000 | Ying | |
| 6,131,095 | A | 10/2000 | Low et al. | |
| 6,131,190 | A | 10/2000 | Sidwell | |
| 6,148,412 | A | 11/2000 | Cannon et al. | |
| 6,154,787 | A | 11/2000 | Urevig et al. | |
| 6,161,111 | A | 12/2000 | Mutalik et al. | |
| 6,167,402 | A | 12/2000 | Yeager | |
| 6,212,512 | B1 | 4/2001 | Barney et al. | |
| 6,260,069 | B1 | 7/2001 | Anglin | |
| 6,269,431 | B1 | 7/2001 | Dunham | |
| 6,275,953 | B1 | 8/2001 | Vahalia et al. | |
| 6,301,592 | B1 | 10/2001 | Aoyama et al. | |
| 6,324,581 | B1 | 11/2001 | Xu et al. | |
| 6,328,766 | B1 | 12/2001 | Long | |
| 6,330,570 | B1 | 12/2001 | Crighton | |
| 6,330,642 | B1 | 12/2001 | Carteau | |
| 6,343,324 | B1 | 1/2002 | Hubis et al. | |
| RE37,601 | E | 3/2002 | Eastridge et al. | |
| 6,356,801 | B1 | 3/2002 | Goodman et al. | |
| 6,389,432 | B1 | 5/2002 | Pothapragada et al. | |
| 6,421,711 | B1 | 7/2002 | Blumenau et al. | |
| 6,487,561 | B1 | 11/2002 | Ofek et al. | |
| 6,519,679 | B2 | 2/2003 | Devireddy et al. | |
| 6,538,669 | B1 | 3/2003 | Lagueux, Jr. et al. | |
| 6,564,228 | B1 | 5/2003 | O'Connor | |
| 6,658,526 | B2 | 12/2003 | Nguyen et al. | |
| 7,010,647 | B1 | 3/2006 | Karamchetty et al. | |
| 7,162,496 | B2 * | 1/2007 | Amarendran et al. | 1/1 |
| 7,219,273 | B2 | 5/2007 | Fisher et al. | |
| 2002/0076206 | A1 | 6/2002 | Hyatt | |
| 2003/0163399 | A1 | 8/2003 | Harper et al. | |
| 2004/0194151 | A1 * | 9/2004 | Earhart | 725/135 |
| 2004/0225634 | A1 * | 11/2004 | Prasad et al. | 707/1 |
| 2004/0225834 | A1 * | 11/2004 | Lu et al. | 711/114 |
| 2008/0229037 | A1 * | 9/2008 | Bunte et al. | 711/162 |
| 2009/0172319 | A1 * | 7/2009 | Gokhale et al. | 711/159 |
| 2011/0093672 | A1 * | 4/2011 | Gokhale et al. | 711/159 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |

OTHER PUBLICATIONS

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

HP StorageWorks Tape Bar Code Label Requirements, Compatibility, and Usage, 2002.

International Search Report and International Preliminary Report on Patentability, PCT/US2003/029106, dated Nov. 19, 2006.

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEMS AND METHODS FOR MANAGING LOCATION OF MEDIA IN A STORAGE SYSTEM

RELATED APPLICATIONS

This application is a continuation of U.S. patent Ser. No. 12/952,456. filed Nov. 23, 2010, which is a continuation of U.S. patent application Ser. No. 12/572,120, filed Oct. 1, 2009, which is a continuation of U.S. patent application Ser. No. 11/638,085, filed Dec. 13, 2006, which is a continuation of U.S. patent application Ser. No. 10/663,383, filed Sep. 16, 2003, which claims priority under 35U.S.C. §119(e) to U.S. Provisional Application No. 60/411,267 filed on Sep. 16, 2002, the entirety of each of which is hereby incorporated herein by reference.

This application is related to the following applications, each of which is hereby incorporated herein by reference in its entirety:

- application Ser. No. 09/495,751, titled HIGH SPEED DATA TRANSFER MECHANISM, filed Jan. 30, 2000, now U.S. Pat. No. 7,209,972, issued Apr. 24, 2007;
- application Ser. No. 09/354,063, titled MODULAR BACKUP AND RETRIEVAL SYSTEM, filed Jul. 15, 1999, now U.S. Pat. No. 7,389,311, issued Jun. 17, 2008;
- application Ser. No. 09/354,058, titled HIERARCHICAL BACKUP AND RETRIEVAL SYSTEM, filed Jul. 15, 1999, now U.S. Pat. No. 7,395,282, issued Jul. 1, 2008;
- application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880, issued Apr. 25, 2006;
- application Ser. No. 09/609,977, titled MODULAR BACKUP AND RETRIEVAL SYSTEM WITH AN INTEGRATED STORAGE AREA FILING SYSTEM, filed Jul. 5, 2000;
- application Ser. No. 09/774,268, titled LOGICAL VIEW AND ACCESS TO PHYSICAL STORAGE IN MODULAR DATA AND STORAGE MANAGEMENT SYSTEM, filed Jan. 30, 2001, now U.S. Pat. No. 6,542,972, issued Apr. 1, 2003;
- application Ser. No. 09/038,440, titled HIGH-SPEED DATA TRANSFER MECHANISM, filed Mar. 11, 1998, now U.S. Pat. No. 6,418,478, issued Jul. 9, 2002; and
- application Ser. No. 10/303,640, titled SELECTIVE DATA REPLICATION SYSTEM AND METHOD, filed Nov. 23, 2001, now U.S. Pat. No. 7,287,047, issued Oct. 23, 2007.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

1. Field of the Invention

The invention relates to data storage in a computer network, and more particularly, to data storage supporting a blind library.

2. Description of the Related Art

Removable media storage devices such as tape libraries, optical libraries, and CD-ROM jukeboxes are frequently used to backup data in computer networks. A removable media storage device generally includes removable media such as tape cartridges, optical disks, or CD-ROMS and a mechanism, such as a robotic arm, that moves the removable media into and out of a drive where content of the media is read or updated.

The removable media are identified in a variety of ways ranging from hand printed labels to machine readable bar codes—all disposed tangibly on an external portion of the media. The media identification can indicate which media is used to store particular data. For example, data from a particular network source, such as a computer or a database, may be designated for storage on a specific tape cartridge. The identification on the tape permits selection of the tape for storage and retrieval of the data stored thereon.

The use of bar codes in removable media identification allows removable media storage libraries to operate autonomously and with greater efficiency. The GALAXY data storage management system software manufactured by COMMVAULT SYSTEMS, INC., of Oceanport, N.J., is an example of a storage system that uses bar coded removable media to perform autonomous storage operations. GALAXY uses removable media storage devices equipped with bar code readers to select removable media for storage operations based on the respective bar codes. A library with a bar code reader automatically identifies a specific removable media according to the bar code thereon and inserts the removable media in a corresponding drive to read or update content. User input is not necessary at each instance and storage operations can proceed according to predefined schedules and criteria resulting in greater efficiency and ease of use than if user input were needed.

Removable media without bar codes and/or storage libraries without bar code readers, however, do not permit such autonomous storage operations. Such libraries are known as blind libraries since conventional storage management software is unable to identify such removable media and user interaction is needed. This inconveniences users and results in decreased efficiency of network storage operations. Yet, many removable media libraries are not equipped with bar code readers and provide no alternative to such manual user input without replacing the entire library.

Thus, there is a need in the art for a system and a method that supports blind libraries in network storage operations.

SUMMARY OF THE INVENTION

The invention generally provides methods and systems for detecting sighted and blind network storage libraries, identifying media contained in the network storage libraries, updating a storage management database with information regarding the network libraries and media, monitoring network libraries for state changes that could indicate the addition or removal of storage media, and updating the storage management database with information regarding the state changes of the storage media.

In the case of sighted libraries, the invention scans bar codes or other machine-readable information to identify each piece of media. In the case of blind libraries, the invention loads each piece of media into a library drive and reads an on-media label ("OML") directly from the media itself. As further described herein, the OML is a unique identifier written as data on the removable storage media.

The invention includes a system and method for operating a storage device. The system comprises a management server, a media agent connected to the management server, a storage device connected to the media agent and a database connected to the management server. The management server controls the media agent to monitor for the addition or removal of a piece of media in the storage device. When the media agent determines that the piece of media has been added to the storage device or removed from the storage device, the media agent causes the storage device to read a media label stored as data on the piece of media, the media label including an identifier identifying the piece of media. When a backup or restore is performed, the system checks the media label to ensure that the correct media is being used. Inventory procedures are disclosed. Media labels are stored in a database along with an indication of the corresponding slot where the media is stored, a time when the label was put on the medium, and a confidence parameter indicating how confident the system is that the particular medium is stored in the respective slot.

One aspect of the invention is a system for operating a storage device, the system comprises a management server, a media agent connected to the management server, a storage device connected to the media agent, and a database connected to the management server. The management server controls the media agent to monitor for the addition or removal of a piece of media in the storage device. When the media agent determines that the piece of media has been added to the storage device or removed from the storage device, the media agent causes the storage device to read a media label stored as data on the piece of media, the media label including an identifier identifying the piece of media.

Another aspect of the invention is a system for operating a storage device, the system comprising a management server, a media agent connected to the management server, a storage device connected to the media agent, and a database connected to the management server. The management server controls the media agent to monitor for the addition of a piece of media in the storage device. When the media agent determines that the piece of media has been added to the storage device, the media agent causes the storage device to write a media label stored as data on the piece of media, the media label including an identifier identifying the piece of media.

Yet another aspect of the invention is a system for backing up data in a storage device, the system comprising a management server, a media agent connected to the management server, a storage device connected to the media agent, and a database connected to the management server. The storage device loads a piece of media. The storage device stores a media label as data on the piece of media, the media label including an identifier identifying the piece of media. The media agent transfers backup data to the piece of media.

Still yet another aspect of the invention is a system for transferring data between a data source and a desired piece of media, the system comprising a management server, a data source connected to the management server, a media agent connected to the management server, a storage device connected to the media agent, and a database connected to the management server. The storage device loads a test piece of media. The storage device reads a media label stored as data on the test piece of media, the media label including an identifier identifying the test piece of media. The media agent transfers data between the data source and the test piece of media when the media label corresponds to the desired piece of media.

Another aspect of the invention is a storage device system comprising a management server, a media agent connected to the management server, a storage device connected to the media agent, and a database connected to the management server. The storage device includes a plurality of pieces of media, each piece of media including a respective media label stored as data on the respective piece of media, each media label including a respective identifier identifying the respective piece of media.

Yet another aspect of the invention is a method of performing an inventory of media stored in a storage device system, the storage device system including a management server, a media agent connected to the management server, a storage device connected to the media agent, and a database connected to the management server. The method comprises loading a piece of the media stored in a slot of the storage device into a drive. The method further comprises reading a media label stored as data on the piece of media, the media label including an identifier identifying the piece of media. The method further comprises storing the identifier in the database in association with an indication of the slot.

Still yet another aspect of the invention is a computer readable storage medium including computer executable code for enabling a system to transfer data between a data source and a desired piece of media, the system comprising a management server, a data source connected to the management server, a media agent connected to the management server, a storage device connected to the media agent, and a database connected to the management server. The computer readable storage medium including data for performing the steps of: controlling the storage device to load a test piece of media. The computer readable storage medium further including data for controlling the storage device to read a media label stored as data on the test piece of media, the media label including an identifier identifying the test piece of media. The computer readable storage medium further including data for controlling the media agent to transfer data between the data source and the test piece of media when the media label corresponds to the desired piece of media.

DETAILED DESCRIPTION OF THE PREFERRED EMBODIMENT

Figure 1:
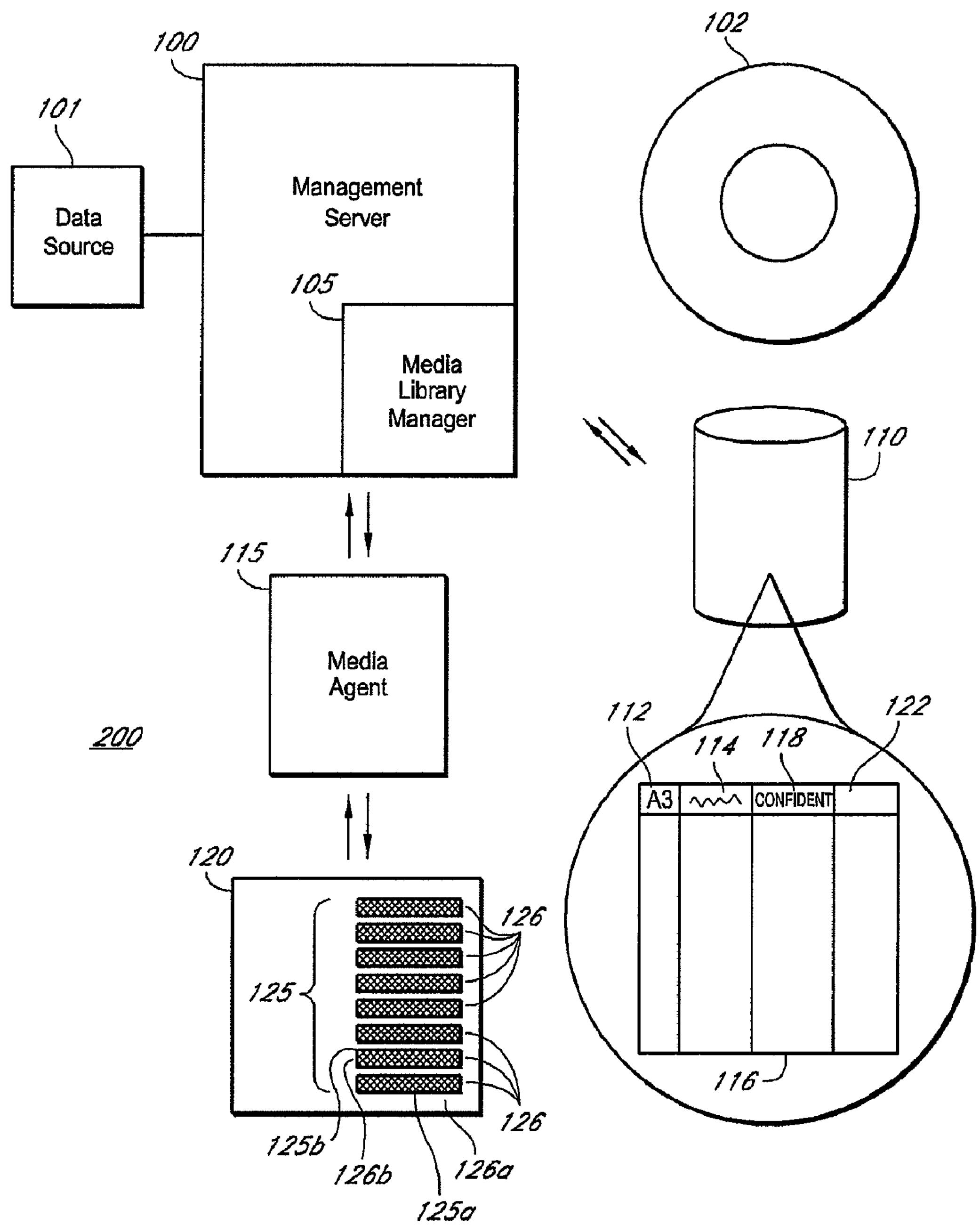
FIG. 1 is a block diagram of a network architecture in accordance with one embodiment of the invention.

Referring to FIG. 1, a storage library system 200 in accordance with the invention comprises a storage management server 100 including a media library manager module ("MLM") 105. A storage management database 110 is connected to MLM 105. A media agent 115 provides communication between server 100 and a removable media storage device library 120. Removable media 125 are used for storage and retrieval of network data stored thereon. Removable media 125 includes, for example, a plurality of tapes stored in slots 126. Although only one media agent 115 and library 120 are shown, clearly a plurality of media agents and libraries may be connected to a single management server. Software for running some operations of server 100 may be stored on a medium 102.

As described in application Ser. No. 09/354,058, titled HIERARCHICAL BACKUP AND RETRIEVAL SYSTEM, filed Jul. 15, 1999, and other applications incorporated by reference herein, modules of the storage management server 100 coordinate and direct storage operations for system 200. For example, media library manager module 105 on storage management server 100 is responsible for communicating with media agents 115 to perform all media related operations. Media library manager module 105 operates according to preferences and data stored in storage management database 110. For example, media library manager module 105 might instruct media agent 115 to periodically backup network data from a particular source 101 to a specific one of removable media 125 in library 120. Storage management database 110 tracks, among other things, network data sources, available removable storage media, such as an individual tape 125*a*, and related associations among these items.

Library 120 may include blind and/or non-blind or "sighted" media 125. System 200 tracks all known media available for network storage operations including when medium 125*a* is added or removed from storage library 120. In the case of "sighted" media and libraries, system 200 automatically identifies when new medium 125*a* with a bar code or other machine-readable identification is added to library 120 by scanning the bar code and updating storage management database 110 accordingly. A bar code, for example, might comprise a combination of letters and numbers or a group of lines symbolizing such an alpha-numeric combination. This alpha-numeric combination on medium 125*a* corresponds to an entry 112 in a library slot table 116 of storage management database 110. In library slot table 116, entry 112 is associated with other media-related information 114 indicating, for example, the storage capacity of library 120, an index of the data stored on individual medium 125*a*, and other useful information.

System 200 automatically identifies when a new piece of media 125 is added or removed from a blind library using additional techniques as further described herein.

Figure 2:
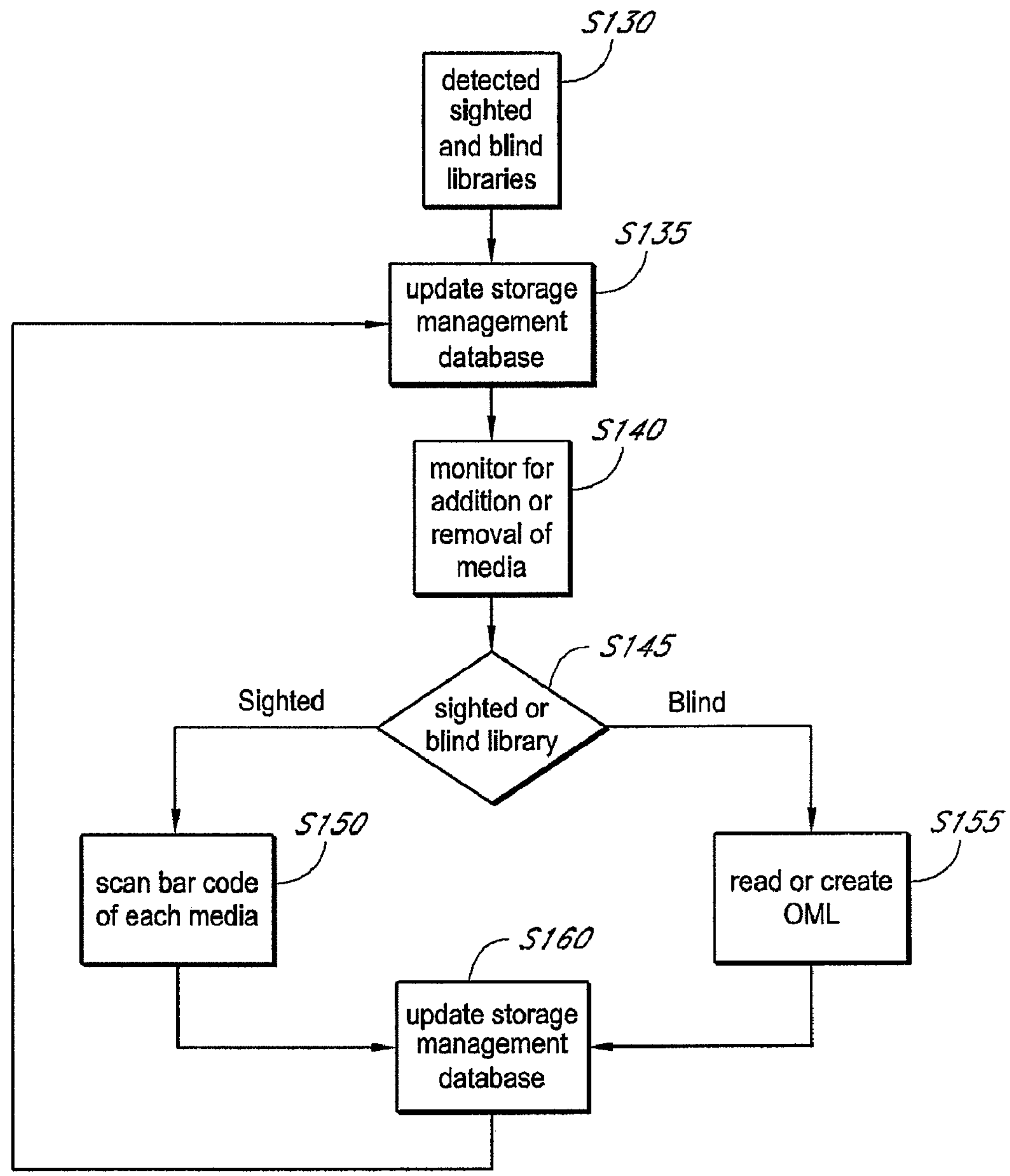
FIG. 2 is a flow chart showing a method in accordance with one embodiment of the invention.

Referring also to FIG. 2, when system 200 is first installed or at other times as instructed by a user or otherwise scheduled, network media agents 115 determine which removable storage media device libraries 120 are blind libraries and which libraries 120 are sighted libraries, at step S130 etc. A dedicated library and drive configuration software tool may be used to detect blind and sighted libraries instead of, or in conjunction with, network media agents 115. The library type information is stored in storage management database 110, at step S135 etc. Media agents 115 monitor network libraries 120 for state changes indicating the addition or removal of a piece of media 125, at step S140 etc. For example, when a library door is opened or a library mail slot is accessed, this may indicate that medium 125*a* has been added to or removed from library 120.

When the media agent 115 detects the addition or removal of a new piece of media 125 from the removable storage media device library 120, the media library manager 105 is informed and consults the storage management database 110 to determine if the library 120 is a blind or a sighted library, at step S145 etc. If the library 120 is a sighted library, the library 120 scans the bar code identifier on the appropriate medium 125*a*, at step S150 etc., and passes this information to the media agent 115.

If library 120 is a blind library, library 120 physically loads the appropriate piece of media 125 into a drive and reads an on-media label ("OML") stored as data in piece of media 125, at step S155 etc., and passes this information to media agent 115. The OML is a unique identifier written as data on the actual medium 125*a*. An OML might comprise an alpha-numeric combination. This alpha-numeric combination on medium 125*a* corresponds to entry 112 in table 116 of storage management database 110. Entry 112 is associated with other media-related information indicating, for example, the storage capacity, slot location in library 120, an index of the data stored on medium 125*a*, and other useful information.

The media agent 115 passes the information identifying medium 125*a* to media library manager module 105, and storage management database 110 is updated, at step S160 etc., to indicate the medium 125*a* present in the library 120. Control returns to step 140 and the media agent 115 continues monitoring state changes of the library 120.

A library management service ("LMS") running on the media agent 115 may be used to support blind libraries in the network. The LMS is a process that monitors the library 120 for state changes and signals MLM 105 when the LMS detects the door of library 120 opening or closing, or when the mail slot is accessed. The LMS also issues mount and unmount commands to library 120 to facilitate storage of data from a network source to a particular media or destination. These associations may be specified by a storage policy, by a user, or by other means, and is stored in the storage management database 110. The LMS also produces a slot configuration for all slots that are occupied.

System 200 supports different forms of media identification for blind libraries. Library slot table 116 in storage management database 110 tracks specific information about medium 125*a* stored in network libraries 120. A confidence parameter 118 is stored in slot table 116 indicating how confident MLM 105 is about the identity of a medium 125*a* in a particular library slot 126. Slot table 116 may, for example, identify the location of a particular medium 125*a* in a particular slot with the values confident, not-confident, not-known, and inventory in progress. If there is an entry in table 116 which indicates that medium 125*a* is in slot 126*a* and the confidence parameter is set to confident, then MLM 105 is sure that slot 126*a* has medium 125*a*. Not-confident slots are those slots that were previously marked confident, but now have become not-confident because a state change was detected—such as the library door opening or the mail slot being accessed. Unknown slots are those slots that have recently been occupied by media but MLM 105 has not read the OML on the media 125 in these slots. Slot table 116 also stores timestamps 122 indicating the last inventory update time for a library slot and a time stamp when the last inventory was done.

System 200 detects and identifies medium 125*a* stored in library 120 using a number of different operations including a forced-full inventory operation, an update inventory operation, a search inventory operation. Inventories generally have the lowest priority.

A forced-full inventory operation involves reading the OML of all removable storage media 125 in library 120. The forced-full inventory operation is generally initiated by a user, but can also be automatically initiated by MLM 105. This operation is often very lengthy and an appropriate warning may be posted to the user with alerts and events. To initiate a forced-full inventory, the MLM 105 populates an administrative task schedule table with the appropriate information or otherwise commences the forced-full inventory operation. A dedicated Application Interface ("API") then starts the inventory process that performs the forced-full inventory. At the end of a forced-full inventory, the inventory process calls an MLM 105 API to indicate the end of the inventory process. After the forced-full inventory operation is complete, all the slots will have the confidence parameter set to confident and the library slot table 116 in the storage management database 110 is updated accordingly. If the library door is opened or the mail slot accessed during the operation, the entire operation is cancelled. Alternatively, library 120 may be marked offline while a forced-full inventory operation is in progress. The forced-full inventory operation should not be performed when backups/restores are currently running on a library 120. Once the forced-full inventory is complete, all known media not found in the library are marked as exported. The forced-full inventory will automatically discover new media because all media in slots are inventoried.

The update inventory operation is a user triggered or MLM 105 triggered incremental inventory. This operation is started so that slots that have not been inventoried or slots that have confidence level set to not-known are inventoried to update the confidence level. Slots that are marked non-confident are generally left alone and non-confident slots are marked as confident when the medium 125*a* from that slot is mounted for backups or restores as further described herein. Library 120 is generally not marked offline during update inventory process. The update inventory operation may become a forced-full inventory operation if all the library slots are marked non-known. The MLM 105 may start an update inventory operation the first time library 120 is configured, migrated from another storage management system, or whenever media agent 115 services are restarted.

Once the user introduces a new or used medium into a library, the system starts an update inventory operation which will inventory slots that are unknown as described herein.

A search inventory operation searches for a particular removable storage medium 125*a* or set of media 125 in library 120. The search inventory operation is often started when a mount fails and the MLM 105 service needs to locate particular medium 125*a*. The MLM 105 populates an administrative task table with a list of the media 125 that needs to be located. Multiple drives may be used in parallel during a search operation. If the inventory process dies in the middle of a search, the job requiring the search is terminated.

During inventory operations, the inventory process calls a media manager API to read each OML. This API issues a system wide blocking call that will reserve a drive and sets the slot confidence level to identification in progress. The media manager API mounts the medium 125*a* in the library 120 slot, reads the OML, updates the storage management database 110, and returns to the inventory process. The inventory process may be multi-threaded and utilize all the drives that are free for the inventory process. A drive that was reserved by an application but failed to mount is flagged as usable.

As discussed, the OML written on the media itself is used to identify removable storage medium 125*a*. MLM 105 uses the storage management database 110 to keep track of which slot 126 includes discovered media 125 so that MLM 105 can perform future mounts of requested medium 125*a* without searching for them. If a required medium 125*a*, however, is not present in the slot indicated by the storage management database 110, then the required medium 125*a* should be searched for in the library 120. The system uses a number of different search algorithms to locate media.

A pigeon hole search scheme is used when a medium X is required for a job. For example, assume that table 116 indicates that medium X is in a particular library 120 in slot 126*a*. When mounted, the MLM 105 discovers that the mounted medium in slot 126*a* is not X but Y, and Y was listed as being in slot 126*b*. MLM 105 updates the library slot table 116 for medium Y and indicates that the medium in slot 126*a* is Y and not X. Then MLM 105 mounts the medium in slot 126*b* to test if it is X. If the medium mounted from slot 126*b* is indeed X then the storage management database 110 is updated and the job continues. If not, the MLM 105 identifies the medium that was mounted from slot 126*b*, updates the storage management database 110 entries for that medium, determines the original location where this medium was stored and mounts the medium from that slot as discussed above. This process continues until medium X is found.

Another searching algorithm is called the oldest mounted media search algorithm, and operates as follows. When a slot is marked as confident, the time is updated in field 122 of table 116 indicating when the slot was marked confident. This time field is used to search for a desired medium 125*a* in the slots 126 that are marked confident if a desired medium 125*a* was not found in any other slots. The slot with the oldest update time will be searched first. Unknown slots may have a timestamp of O.

A library may be kept online when an inventory is in progress except when during a forced-full inventory. Alternatively, at any given time, only one inventory process can be running for a library and the information of a running inventory process and the type of inventory is stored in table 116 and displayed on a GUI.

Figures 3, 4:
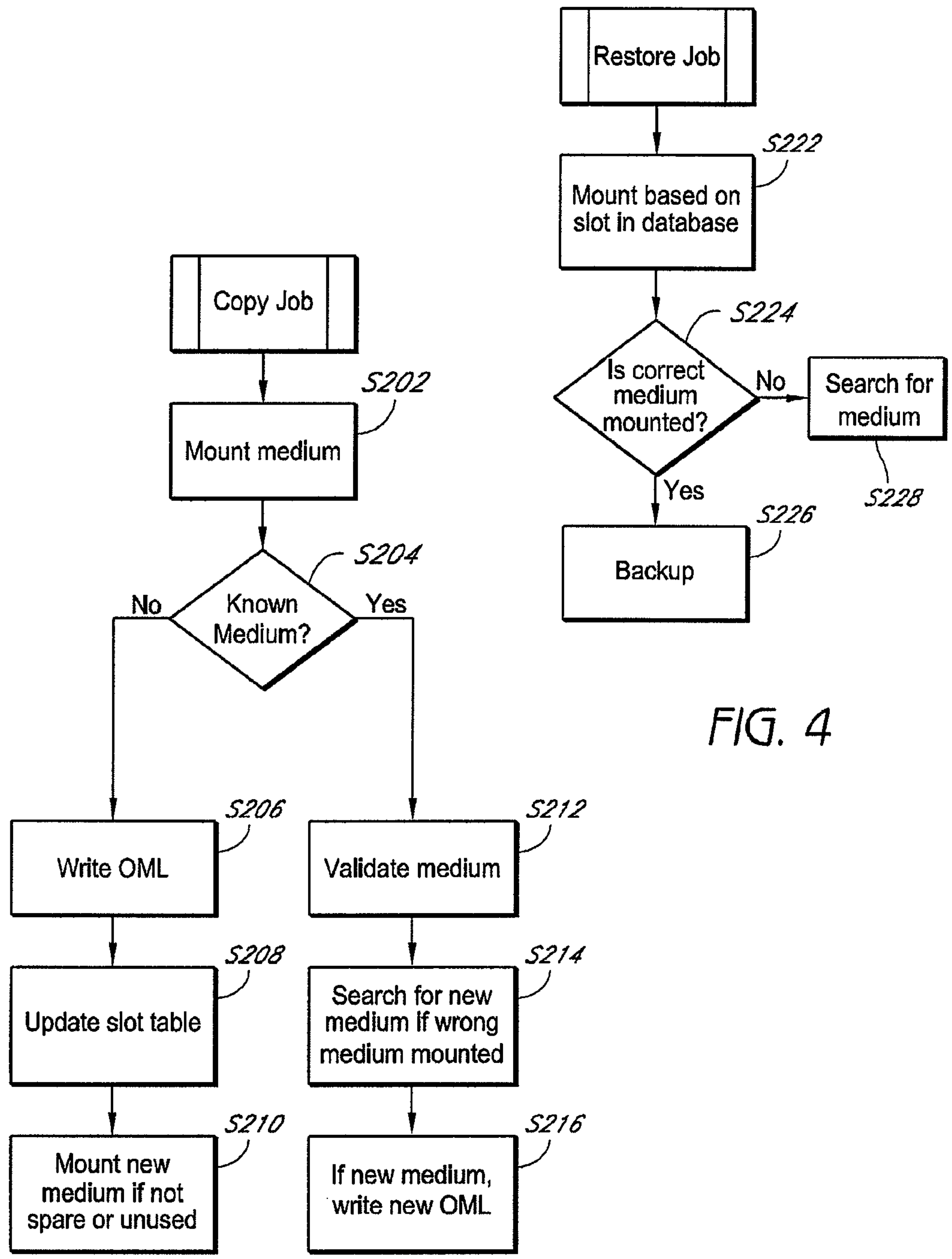
FIG. 3 is a flow chart showing a method in accordance with one embodiment of the invention.
FIG. 4 is a flow chart showing a method in accordance with one embodiment of the invention.

A summary of copy and restore operations of the invention will now be explained. Referring to FIG. 3, if a copy or storage operation job requests MLM 105 to mount a piece of media 125*a*, step S202 the system determines whether the medium 125*a* is an unknown medium at step S204. If the medium is unknown, system 200 writes an OML on medium 125*a*, step S206. This OML identifies this medium 125*a* in future operations within system 200. Once the OML is written on medium 125*a*, system 200 also updates library slot table 116 in the storage management database 110, identifying medium 125*a*, setting medium 125*a* as discovered, and indicating the time the OML was written on to the medium 125*a*, step S208. The corresponding slot is also listed in slot table 116 and indicated as being confident. Thus, new undiscovered medium 125*a* in the library 120 is discovered and the necessary information updated in the storage management database 110. If the medium 125*a* mounted is not a spare or unused media, then MLM 105 will look for the next spare media for the backup, step S210.

If the medium 125*a* to be mounted has already been discovered or is known at step S204, then MLM 105 reads the OML on the medium 125*a* to validate and ensure that the correct media has been mounted, step S212. If the medium mounted in the drive is correct then the copy continues. If the mounted medium is not the correct one, then the correct medium should be searched for and mounted, step S214. The medium is then searched in the library 120 using one of the search schemes described above. A mount API indicates success or failure of the search operation. The system handles errors and retries until successful, until a different error code is returned, or the system passes an error flag to an API to indicate that it should wait and then retry in case the mount failures are due to an incorrect medium in a slot.

If the mounted medium is a new spare medium, then system 200 erases any existing OML, writes a new OML, and updates the storage management database 110. If the medium 125*a* belongs to a spare group identified in the storage management database 110, that is different from a desired spare group, then the medium 125*a* is moved into the correct spare group corresponding to the media group. This reduces mount time. If the medium 125*a* is not found in the library 120 then the medium 125*a* is marked full and the backup continues on the next confident spare media. If there are no confident spare media 125, then the next not-confident spare media is selected as the active medium.

An incremental inventory may be started to search for a spare media 125 that was not found. Alternatively, the list of media 125 that needs to be searched for can be updated in an administrative task table even when an inventory process is already searching for a given medium 125*a*. When allocating media to a media group, confident media may be considered first.

Referring to FIG. 4, restore jobs retrieve specific data stored on a specific medium 125*a*. System 200 mounts the required medium 125*a* from the slot 126 where the storage management database 110 indicates the medium 125*a* is residing, step S222. The OML of the medium 125*a* is read to verify that the correct medium 125*a* has been mounted, step S224. If the OML is correct, the restore operation continues and data is retrieved from the medium 125*a*, step S226. If the OML is incorrect indicating that the wrong medium 125*a* is in the drive, the correct medium should be searched for in the library 120 before the job can continue, step S228. System 200 may inform the user that the requested medium 125*a* is not in the library 120. Alternatively, MLM 105 or storage management database 110 may indicate that the medium 125*a* was exported, and the system 200 displays a message to the user indicating that medium 125*a* is outside the library 120. Another option is for the user to manually force a search inventory operation to try and locate the missing medium.

Confident media can be exported without verification. Media in slots 126 that are not confident should be verified before export. Exports are scheduled or initiated manually by a user. A message prompting the user to label the media may be shown on a GUI from the invoked export. The export process calls a media manager API to verify the OML and then export the media. Export media verification is performed sequentially. Once all the media have been verified, then all the media is exported. Users can also select a specific media to export by slot without verification. For example, a user may want to remove a medium and does not want it to be verified. Appropriate warnings may be issued when users attempt to export media without verification.

If the connection between storage management server 100 and media agent 115 is lost, storage management server 100 attempts to reconnect to media agent 115. If the connection cannot be reestablished, then media agent 115 is presumed dead and all of the slots for all libraries 120 connected to and controlled by this media agent 115 are marked as not-confident.

A user may be provided with an easy upgrade path to migrate an RSM or other storage management system controlled library to the blind library control system of the present invention. This is supported regardless of whether library 120 is blind or sighted. The process involves resetting a number of fields stored in the storage management database 110 including the GUID field on all the Media, MediaGroup, SpareGroup, Library, and Drive tables and updating the drive controller and library controller types to DMS/LMS controlled. The slot table entries for the library are deleted. The LMS recreates the slot table entries and all the slots are marked as unknown and an update inventory is started for a blind library.

A blind library can be converted to a sighted library by labeling all the media 125 with a unique barcode and fitting a barcode reader in the library. A library and drive configuration tool allows the user to change the property of a library from blind to sighted in the storage management database 110. A user might, for example, use a GUI or other input method to input changes to the storage management database 110 and update fields to change the property of a library 120. Once a barcode reader has been fitted, the user re-configures the library as a sighted library. A flag is set that indicates that MLM 105 has to validate the barcode reader and co-relate the barcode pushed up by the LMS to all the media 125 that are currently in the slot table in the storage management database 110.

If a library inventory is started and all the slots for a library return a media status set to invalid barcode, then the presence of barcode reader has not been verified. Common causes are that the user made a mistake about the library being sighted or the barcode reader is not functioning correctly. In either case an event will be logged in the storage management database indicating the problem and the library will be marked offline. The user will then have a choice to mark the library back to blind.

Once the barcode reader has been verified, MLM 105 will start a full-forced inventory process on the library whereby it will mount all the media in the library, read the OML for the media 125, and update the slot table 116 with the correct media identifier. When all the slots have been verified, then the library 120 is ready to use. Once this process completes, a barcode matching flag is reset and the library 120 becomes permanently sighted.

Media 125 that has been exported from library 120 should be updated with the barcode. A user may employ the unique Ids in the storage management database 110 to correlate the media 125. The barcode fitted on each of these media 125 is then stored in storage management database 110. Users may enter barcode information via a GUI.

If the users skip the GUI step, then the media 125 (now fitted with barcodes) are imported into the library 120 and are treated as spares. When a spare is allocated and mounted, if it is found that it is a medium 125*a* with valid data, then the storage management database 110 is updated accordingly. A fresh spare is then selected and the operation continues.

If the user has made a mistake in associating barcodes, (or barcodes were swapped on an already sighted library 120) then during a mount, MLM 105 will detect a medium 125*a* whose OML doesn't match with the barcode. An appropriate event is generated citing the cause of failure and listing both the barcodes. A user intervention is then required to correct the situation by updating the barcodes from the GUI.

Thus, by providing an on media label stored as data on the piece of media itself, a system is created where blind media library may operate autonomously.

Systems and modules described herein may comprise software, firmware, hardware, or any combination(s) of software, firmware, and/or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, and/or any electronic information storage schemes or methods, or any combinations thereof, suitable for the purposes described herein. User interface elements described herein may comprise elements from graphical user interfaces, command line interfaces, and other interfaces suitable for the purposes described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of inventorying data, the method comprising:

receiving an inventory request to inventory media associated with at least a portion of a storage system, wherein the media comprises at least a first removable sighted media and a second removable blind media;

mounting the first removable sighted media and reading a barcode associated therewith;

storing in a database first location information about the first removable sighted media;

mounting a second removable blind media, wherein the second removable blind media does not have a barcode associated therewith;

reading an on-media label stored on the second removable media; and storing in the database, second location information about the second removable blind media such that the database comprises the first location information about the removable sighted media and the second location information about the second removable blind media.

2. The method as recited in claim 1, further comprising searching for media based on the first and second location information in the database.

3. The method as recited in claim 2, further comprising searching for media based on a time the media was identified as confident.

4. The method as recited in claim 2, further comprising searching for media based on an oldest update time of the media.

5. The method as recited in claim 2, further comprising searching for the media by searching for a slot assigned to the media.

6. The method of claim 1 further comprising a confidence parameter indicating a confidence level that the second removable blind media is associated with a slot.

7. The method of claim 6 wherein the confidence parameter is stored in a slot table that further identifies the slot assigned the removable blind media.

8. A system for inventorying data, the system comprising:

an inventory request that initiates an inventory of media associated with at least a portion of a storage system, the media comprising at least a first removable sighted media and at least a second removable blind media;

a database configured to store a first location of the first removable sighted media, and wherein the database is further configured to store a second location of the removable blind media;

one or more computer processors configured to mount the first removable sighted media and read a barcode associated therewith, wherein the one or more computer processors are configured to store the first location information about the first removable sighted media in the database; and one or more computer processors configured to mount the second removable blind media, wherein the second removable blind media does not have a barcode associated therewith, wherein the one or more computer processors are further configured to read an on-media label stored on the second removable media and store the second location information about the second removable blind media in the database.

9. The system as recited in claim 8, further comprising one or more computer processors configured to search for media based on the first and second location information in the database.

10. The system as recited in claim 9, wherein the one or more computer processors are further configured to search for media based on a time the media was identified as confident.

11. The system as recited in claim 9, wherein the one or more computer processors are further configured to search for media based on an oldest update time of the media.

12. The system as recited in claim 9, wherein the one or more computer processors are further configured to search for media by searching for a slot assigned to the media.

13. The system of claim 8 wherein the database further comprises a confidence parameter indicating a confidence level that the second removable blind media is associated with a slot.

14. The system of claim 13 wherein the confidence parameter is stored in a slot table that further identifies the slot assigned to the second removable blind media.

* * * * *